United States Patent Office 3,441,075
Patented Apr. 29, 1969

3,441,075
METHOD FOR HEATING AND EVAPORATING AQUEOUS SOLUTIONS BY THE USE OF A POLYMETHINE SALT
Bernard S. Wildi, Kirkwood, Mo., and William B. Tuemmler, Catonsville, Md., assignors to Monsanto Company, St. Louis, Mo., a corporation of Delaware
No Drawing. Application July 13, 1962, Ser. No. 209,782, which is a division of application Ser. No. 547,044, Nov. 15, 1955, now Patent No. 3,099,630, dated July 30, 1963. Divided and this application Dec. 26, 1967, Ser. No. 693,115
Int. Cl. F26b *3/28;* B01d *1/00*
U.S. Cl. 159—47  11 Claims

ABSTRACT OF THE DISCLOSURE

A method of increasing solar evaporation of water and aqueous solutions and the like by incorporating therein at least about 5 p.p.m. of a defined polymethine salt having a strong proton acid anion containing a sufficient number of hydrophilic groups from the class of organic hydroxy-containing carboxylic and sulfonic acids to characterize said salt with a solubility of at least 5 p.p.m.

---

The water-soluble polymethine salts are disclosed and claimed in our parent application Ser. No. 547,044, filed Nov. 15, 1955, now U.S. Patent 3,099,630, issued July 30, 1963; and the method of increasing solar evaporation of aqueous solutions containing minor amounts of a polybasic acid-polymethine salt is disclosed and claimed in our copending application Ser. No. 209,782, filed July 13, 1962 as a divisional application from the aforesaid then copending parent application, and now U.S. Patent 3,361,186, issued Jan. 2, 1968; of which the invention disclosed and claimed in the instant application is a further divisional application.

This invention relates to a novel method for increasing the rate of absorption of radiant energy by water, and for converting said radiant energy to thermal energy. The invention also relates to a novel method for increasing the rate of evaporation of water from aqueous solutions by the use of radiant energy, particularly solar energy.

There are numerous occasions where the absorption of radiant energy by water or aqueous solutions becomes of considerable importance. One outstanding example is the recovery of dissolved solids or fresh water from sea water by solar evaporation. Solar evaporation can also be utilized in the same manner with respect to aqueous solutions or waste waters produced in industrial plants. Solar energy, or other forms of radiant energy of comparable wave lengths, can also be utilized for heating water or aqueous solutions. All of these and similar operations are considerably enhanced by the practice of the present invention, which involves the addition of small amounts of particular additives to water or aqueous solutions to greatly increase the efficiency of absorption of radiant energy into such solutions.

It has now been found that the effectiveness of heating and evaporating water or aqueous solutions can be very greatly increased by dissolving in the water or aqueous solution a small amount of one or more of the materials defined and described more fully immediately below. The exact amounts of these materials to be used will vary somewhat with the particular material selected, in some cases as little as one or two parts per million being sufficient. It is generally desirable to use at least about one part per million. A preferred range of concentrations comprises between about 3 and about 25 parts per million.

The materials used according to the present invention are water-soluble phthalocyanine dyes and water-soluble polymethine dyes. The polymethine dyes are defined as ammonium salts containing a polymethine chain, $$=CH(-CH=CH)_n-$$

terminating at either end with a nitrogen atom. A part of the polymethine chain can be included in a ring system, either aromatic or otherwise. The $n$ in the foregoing polymethine chain formula can be any integer, including 0, but will preferably be a relatively small number, for example, not greater than about 5.

Polymethine dyes as a general class are water-insoluble compounds. They are solubilized by forming salts of strong proton acids containing hydrophilic groups (e.g., carboxyl groups, hydroxyl groups, sulfonic acid groups, polyalkoxy groups, etc.) in excess of the acid function which is neutralized by the polymethine cation. Examples of solubilizing acids suitable for water-soluble polymethine dye salt formation are polycarboxylic (including dicarboxylic) acids, such as adipic acid, succinic acid, maleic acid, polymers of acrylic and/or methacrylic acids, hydrolyzed copolymers of ethylene, isobutylene, etc. and unsaturated cyclic anhydrides such as maleic anhydride, etc.; polysulfonic acids, and particularly aromatic sulfonic acids, such as sulfonated polystyrene, etc.; and similar strong proton acids having a multiplicity of hydrophilic acid groups per molecule. The foregoing polyacids should be combined with the polymethine bases described herein in amounts such that not more than about 75 percent, and preferably not more than about 30 percent, of the hydrophilic groups are neutralized by the polymethine bases. After formation of the water-soluble polymethine salt, the remaining free acid groups can be neutralized with metallic hydroxides such as the alkali metal or ammonium hydroxides, which will in many instances increase the water-solubility of the polymethine salt.

Another class of suitable water-solubilizing acids comprise hydroxy, and especially polyhydroxy, mono and polycarboxylic and sulfonic acids, such as citric acid gluconic acid, mucic acid, saccharic acid, hydroxyadipic acid, malic acid, p-hydroxybenzenesulfonic acid, naphthol, disulfonic acids, etc.; other suitable water-solubilizing acids are those having the general formula, $$A—R—(O\text{-}Alkyl)_x—OH$$

where A is an acid group, such as a carboxyl or sulfonic acid group; R is a hydrocarbyl group, such as an aryl group, an alkyl group, an alkaryl group, aralkyl group, etc.; the $—(O\text{-}Alkyl)_x—$ is a polyalkoxy chain such as is derived from ethylene oxide, propylene oxide or the like; and $x$ is an integer from 1 to as high as 50, inclusive, and preferably from about 5 to about 20, inclusive. Examples of such compounds are the polyalkylene oxide derivatives of acids such as salicylic acid, glycolic acid, naphtholsulfonic acid, p-hydroxyphenylpropionic acid, etc.

The polymethines employed in the present invention can be classified in three categories: (a) compounds in which each of the nitrogen atoms at the termini of the polymethine chain is a part of a heterocyclic ring system; these compounds are generally called cyanines; (b) compounds in which only one of the nitrogen atoms at the termini of the polymethine chain is in a heterocyclic ring system; these compounds are generally called hemicyanines; (c) compounds in which neither of the nitrogen atoms at the termini of the polymethine chain is in a heterocyclic ring system; these compounds are referred to hereinafter as "non-cyanine polymethines." This latter type of polymethine constitutes a novel and particularly preferred class of compounds for use according to the present invention.

These preferred non-cyanine polymethine compounds can be represented by the following general formula:

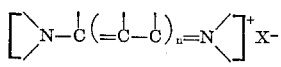

wherein $n$ is an integer, including 0, and $X^-$ is an anion of any of the strong proton acids discussed above. An example of a salt of this class is the citrate salt of the polymethine base obtained by the alkylation of the dianilide of glutaconic aldehyde, which gives the following compound:

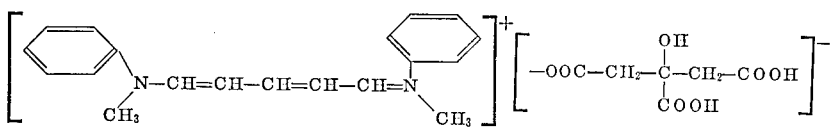

A further preferred class of the immediately preceding polymethine compounds are the following, in which two aromatic ring systems are a part of the polymethine chain:

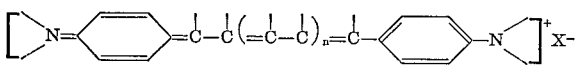

wherein $n$ and $X^-$ are as described above.

The identity of other substituents in the molecule—i.e., substitutions upon the essential structure shown above—is of relatively little importance. Preferred substituents for attachment to the terminal nitrogen atoms are alkyl hydrocarbyl groups, especially lower alkyl groups such as methyl, ethyl, isopropyl, n-propyl, n-butyl, 2-ethylhexyl, etc., but other substituents such as hydrogen atoms or other higher alkyl groups such as cetyl or stearyl groups, other hydrocarbyl groups such as alkenyl, aryl, aralkyl or alicyclic radicals, or hydrocarbyl radicals substituted with groups such as hydroxy, alkoxy, sulfonic acid, halo (especially chloro), amino, and nitro groups, etc. are also suitable.

Preferred substituents for attachment to the terminal methine carbon atoms are aryl groups, especially aryl groups substituted with halo (particularly chloro), amino, hydroxy, alkoxy, N-alkyl and N,N-dialkylamino groups, etc., but other substituents such as those mentioned with respect to the nitrogen atom substituents of the foregoing paragraph are also suitable.

Preferred substituents for attachment to the non-terminal methine carbon atoms are hydrogen atoms or lower alkyl groups such as mentioned above, but other substituents, e.g., those listed in the preceding two paragraphs are acceptable—and under some circumstances even desirable.

Examples of typical compounds of the non-cyanine polymethine class are 1,3-bis(4-aminophenyl)vinylcarbonium dihydrogen citrate; 1,5-bis(4-aminophenyl)divinylcarbonium gluconate; 1,7 - bis - (4-aminophenyl)trivinylcarbonium acid mucate; 1,5-bis[4-(N,N-dimethylamino)phenyl] - 3,4 - dimethyldivinylcarbonium hydrogen saccharate; 1-[4-(N,N-diethylamino)phenyl]-7-[4-(N,N-dimethylamino)phenyl] - 1 - phenyl-3-ethyl-7-(4-chlorophenyl)trivinylcarbonium hydrogen adipate; 1,1,5,5-tetrakis[4-(N,N-dimethylamino)-phenyl] - 3 - (4 - chlorophenyl)divinylcarbonium hydrogen hydroxyadipate; 1,7-bis {4-[N,N - di(2 - hydroxyethyl)amino]-phenyl} - 1,7 - bis (2 - chloroethyl)-4-(4-nitrophenyl)trivinylcarbonium hydrogen succinate; the 1,1,7,7-tetrakis-[4-(N,N-diethylamino)phenyl]trivinylcarbonium salt of a sulfonated polystyrene having a molecular weight of approximately 10,000, in which approximately half of the sulfonic acid groups are neutralized by the carbonium base and the remainder are neutralized by sodium hydroxide; 1,5-bis-[4-(N - methylamino)phenyl]-1-(4-chlorophenyl)divinylcarbonium hydrogen maleate; etc.

A typical method by which the immediately foregoing and similar polymethine compounds can be prepared involves the reaction of equimolar quantities of a p-aminophenyl alkene of the class

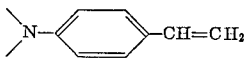

and a p-aminophenyl aldehyde (or ketone) of the class

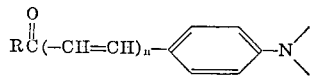

wherein $n$ is equal to an integer including 0, and wherein R may be either a hydrogen atom or an organic radical. These materials are allowed to react in a non-aqueous solvent such as acetic acid or acetic anhydride, and the acid (the salt of which it is desired to form) is added to the reaction mixture. It is believed that an allene compound of the type

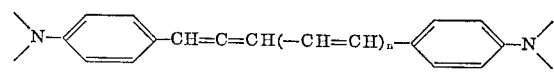

is formed as an intermediate which then reacts with the acid to form the desired polymethine salt.

In some cases it may be more convenient to first form the above salt of a strong inorganic acid, e.g., perchloric acid, and then convert the inorganic salt to the water-soluble salt. This can be done by suspending the inorganic acid salt with an equivalent of a strong inorganic base, such as sodium hydroxide, in a benzene-water mixture to convert the salt to the colorless dye base. The benzene layer (containing the colorless dye base) is washed with water and then dried, e.g., over sodium sulfate. The resulting benzene solution is then mixed with an excess of aqueous solution of one of the solubilizing acids described above, and the benzene is boiled off leaving an aqueous solution of the water-soluble dye of the present invention.

An alternative method of preparation which can be used in making symmetrical non-cyanine polymethines having 5 or more methine carbon atoms in the polymethine chain involves the reaction of two molar proportions of a p-aminophenylalkene of the class.

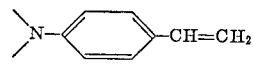

with one mole of an ortho ester (or vinylogue thereof) of the class

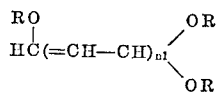

wherein $n_1$ is an integer, including 0. The procedure to be followed in this method is very much like the above-described method in that the reactants are allowed to react in a non-aqueous solvent with the addition of a strong inorganic acid to form the carbonium salt, which is then converted to the water-soluble salt by the same general procedure outlined above.

The cyanine dye salts suitable for use according to the present invention can be readily prepared by formation of the strong inorganic acid salts according to well-known prior art methods, followed by conversion to the water-solubilizing acid salts by the same general procedures outlined above with the respect to the non-cyanine polymethine dye salts.

The water-soluble cyanine salts employed in this invention include not only the classical cyanines, in which both of the terminal nitrogen atoms are in heterocyclic rings, but also the so-called hemicyanines, in which one of the nitrogen atoms is in a heterocyclic ring and one is not. While the term cyanine was originally applied only to compounds in which the nitrogen-containing rings were quinoline rings, the term cyanine is now used in a broader sense to include other heterocyclic nitrogen-containing ring systems such as pyridine, indoles, benzothiazoles, benzoseleneazoles, thiazolenes, benzoxazoles, $\alpha$- and $\beta$-naphthothiazoles, and the like—and the term as used with respect to the present invention is intended to include these latter nitrogen-containing heterocyclic ring systems.

Examples of suitable water-soluble cyanine dye salts for use in the present invention are the succinic acid salt of Quinoline Blue, the saccharic acid salt of Sensitol Green, the citric acid salt of Dicyanine, the gluconic acid salt of Kryptocyanine, the hydroxyadipic acid salt of Xenocyanine, the polyacrylic acid salt of 3,3'-dimethylthiacarbocyanine, the maleic acid salt of Bau 2000, the sulfonated polystyrene salt of Astra Violet FF Extra, the maleic acid salt of Astrazon Yellow 3G, etc.

The water-soluble phthalocyanine dyes used according to this invention are phthalocyanines which have been modified by forming sulfonic acid derivatives or salts thereof, sulfonamide derivatives, carboxylic acid derivatives or salts thereof, quaternary ammonium and ternary sulfonium salts, and the like. Examples of such water-soluble phthalocyanines are Heliogen Blue SBL, Durazol Fast Blue 8GS, Zapon Fast Blue HL, Sirium Light Green FFGL, copper octapyridinylacetyltetraaminophthalocyanine octachloride, etc.

Examples illustrative of the synthesis of inorganic acid salts of non-cyanine polymethine dyes from which the novel water-soluble polymethine dyes can be prepared are set out in our said copending application Ser. No. 209,782, now U.S. Patent 3,361,186, which application is incorporated herein by reference.

The strong inorganic acid salts of the polymethine dyes prepared as described in the foregoing examples can be readily converted to the water-soluble salts employed in the present invention in accordance with the general procedure set forth in an earlier portion of this disclosure. Specific examples representative of the general procedure are set forth in the following Examples 1 through 6.

EXAMPLE 1

Preparation of 1,1,5,5 - tetrakis[4 - (N,N-dimethylamino) phenyl]divinylcarbonium salt of sulfonated polystrene Symmetrical pentamethine perchlorate prepared as described in Example 2, of said copending application, was converted to the free base by mixing 1.85 g. of the perchlorate salt and 0.2 g. of sodium hydroxide in 50 ml. of ethanol. Ether (150 ml.) was then added to the reaction mixture and the resulting light green solution was washed with dilute aqueous solution of sodium chloride to remove excess alkali and sodium perchlorate. The remaining green organic solution was dried over sodium sulfate, filtered and concentrated under vacuum. The concentrated dark green solution was dissolved in 150 ml. of ethanol and then vigorously stirred with 40 ml. of 0.0725 N aqueous solution of a sulfonated polystyrene (molecular weight about 10,000; average of about 1.1 sulfonic acid groups per aromatic ring; about 54% of sulfonic acid groups as free acid, the remainder as sodium sulfonate groups). The resulting solution was treated with ether to give a reddish-brown powdery precipitate was collected, washed with ether and dried to give about a 75% yield of product salt melting above 300° C. and having infra-red absorption. Maxima at the following wave lengths (microns): 3.00, 6.25, 6.65, 7.30, 7.40, 7.80, 7.95, 8.15, 8.60, 9.05, 9.65. 10.10, 10.65, 10.90, 12.15, 13.00 13.65 14.90 and 15.6. The salt can be readily dissolved in boiling water to give a solution which remains stable upon cooling to room temperature or below.

EXAMPLE 2

Preparation of 1,1,5,5 - tetrakis[4 - (N,N-dimethylamino) phenyl]divinylcarbonium salt of gluconic acid A stock solution of the carbonium base was prepared by converting 0.5 g. of the carbonium perchlorate to the carbonium base in much the same manner as described in the preceding Example 1, and then diluting the base to 125 ml. in benzene. To 0.3 ml. of this stock solution there was added 5 ml. of a 0.1 molar solution of gluconic acid in water. The mixture was boiled to remove benzene, thereby leaving an aqueous solution of the desired 1,1,5,5 - tetrakis[4 - (N,N - dimethylamino)phenyl] divinylcarbonium gluconate.

EXAMPLE 3

Preparation of 1,1,5,5 - tetrakis [4-(N,N-dimethylamino)-phenyl/divinylcarbonium salt of polycarboxylic acid (ammoniated copolymer of isobutylene and maleic anhydride)

One-tenth gram of a polycarboxylic acid prepared by ammoniation of the copolymer of isobutylene and maleic anhydride (1:1 mole ratio of monomers, average molecular weight about 150,000–200,000) was dissolved in 100 ml. of water. Ten milliliters of the resulting aqueous solution was added to 0.5 ml. of carbonium base stock solution (see Example 2), and the mixture was boiled, thereby removing benzene and leaving an aqueous solution of the desired compound 1,1,5,5-tetrakis [4-(N,N-dimethylamino)phenyl] divinylcarbonium polycarboxylate.

EXAMPLE 4

Preparation of 1,1,5,5 - tetrakis [4-(N,N-dimethylamino)-phenyl)divinylcarbonium salt of polycarboxylic acid A solution of polyacrylic acid was prepared by dissolving 0.01 gram of the acid (molecular weight about 100,000) in 100 ml. of water. Ten milliliters of this solution was added to one-half milliliter of the carbonium base stock solution (see Example 2) and the resulting solution was boiled, thereby removing the benzene and leaving an aqueous solution of the desired carbonium acrylate.

EXAMPLE 5

Preparation of 1,1,5,5 - tetrakis [4-(N,N-dimethylamino)-phenyl]divinylcarbonium salt of hydrolyzed copolymer of ethylene and maleic anhydride One one-hundredth grams of a polycarboxylic acid formed by hydrolysis of a copolymer of ethylene and maleic anhydride (1:1 mole ratio of monomers, molecular weight about 1500) was dissolved in 100 ml. of water. Ten milliliters of the resulting solution was mixed with one-half milliliter of the carbonium base stock solution (see Example 2) and the mixture was boiled, thereby removing the benzene and leaving an aqueous solution of the desired carbonium polycarboxylate. A trace of sodium bicarbonate was added to facilitate solution of the salt in water.

EXAMPLE 6

Preparation of 1,1,5,5 - tetrakis [4-(N,N-dimethylamino) phenyl] divinylcarbonium salt of mucic acid Three-tenths milliliters of the carbonium base stock solution (see Eaxmple 2) was mixed with 5 ml. of a 0.05 molar solution of mucic acid in water. The resulting mixture was boiled, thereby removing benzene and leaving an aqueous solution of the desired carbonium mucate.

The following example illustrates the marked effectiveness of the various dyes of the present invention in increasing the rate of evaporation of water exposed to solar radiation.

EXAMPLE 7

Nine hundred ninety-nine and one-half gram quantities of water were placed in each of three 17.5 cm. crystallizing dishes. In one dish 10 p.p.m. of a phthalocyanine dye was dissolved. In a second dish 10 p.p.m. of the polymethine dye as prepared in Example 14 was dissolved in the water. The third dish was left with no additive in the water. The three dishes were placed on white paper out of doors in open sunlight and allowed to stand for about 8 hours. The dishes were weighted periodically to determine the rate of evaporation of water from the dishes. The results are tabulated in the following table:

| Sample | Water lost by evaporation (grams) | Rate of evaporation at steady state (grams/hr.) | Percent increase in evaporation rate |
|---|---|---|---|
| (A) Water with 10 p.p.m. phthalocyanine dye (Pontamine Fast Turquoise) | 149.5 | 21.1 | 29 |
| (B) Water with 10 p.p.m. polymethine dye (of Example 1) | 194 | 29 | 78 |
| (C) Water with no additive | 109.5 | 16.3 | |

From the foregoing examples it can be seen that the phthalocyanine dyes and polymethine dyes have a very marked effect upon the rate of solar evaporation of water. It can also be seen that the novel water-soluble polymethine dye salts which constitute preferred embodiments of the present invention are over twice as effective in increasing this solar evaporation rate as are the less preferred (though still very effective phthalocyanine dyes.

We claim:

1. The method of increasing the rate of evaporation of aqueous solutions exposed to solar radiation, which method comprises incorporating into said solutions at least 5 p.p.m. of a polymethine salt of the class

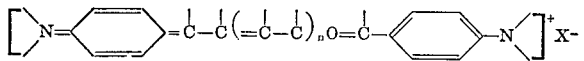

wherein $n$ is a positive integer, including 0 and wherein $X^-$ is the strong proton acid anion of an organic hydroxy-containing carboxylic or sulfonic acid containing a sufficient number of hydrophilic groups to give the aforesaid salt a water-solubility of at least 5 p.p.m. and having only a portion of the acid groups therein neutralized by the polymethine dye base.

2. The method of claim 1, wherein the said acid is a hydroxy carboxylic acid.

3. The method of claim 2, wherein the acid is gluconic acid.

4. The method of claim 3, wherein the salt is 1,1,5,5-tetrakis[4 - N,N - dimethylamino)phenyl]divinylcarbonium gluconate.

5. The method of claim 3, wherein the salt is 1,5-bis(4-aminophenyl)divinylcarbonium gluconate.

6. The method of claim 2, wherein the acid is salicyclic acid.

7. The method of claim 2, wherein the acid is glycolic acid.

8. The method of claim 2, wherein the acid is p-hydroxyphenylpropionic acid.

9. The method of claim 1, wherein the said acid is a hydroxy sulfonic acid.

10. The method of claim 9, wherein the acid is p-hydroxybenzenesulfonic acid.

11. The method of claim 9, wherein the acid is naphtholsulfonic acid.

References Cited

UNITED STATES PATENTS 2,813,802  11/1957  Ingle et al. _____ 260—396

OTHER REFERENCES

Venkataraman: "Synthetic Dyes," 1952, Academic Press, N.Y., pp. 1145 and 1133 and 1146.

WILBUR L. BASCOMB, JR., *Primary Examiner.*

U.S. Cl. X.R.

203—10, 100; 260—22, 29.6, 78.5, 80, 240.5, 240.6, 314.5, 396, 501, 501.15

PO-1050
(5/69)

UNITED STATES PATENT OFFICE
CERTIFICATE OF CORRECTION

Patent No. 3,441,075          Dated April 29, 1969

Inventor(s) Bernard S. Wildi and William B. Tuemmler

It is certified that error appears in the above-identified patent and that said Letters Patent are hereby corrected as shown below:

Column 4, line 74, the word "the" should be deleted.

Column 5, line 69, that portion of the sentence reading "precipitate was" should read -- precipitate which was --.

Column 6, line 21, that portion of the sentence reading "phenyl/" should read -- phenyl] --; Column 6, line 37, that portion of the sentence reading "phenyl)" should read -- phenyl] --; Column 6, line 37, the word "polycarboxylic" should read -- polyacrylic --; Column 6, line 68, the word "Eaxmple" should read -- Example --.

Column 7, line 11, the word "weighted" should read -- weighed --.

Claim 1, line 5, that portion of the formula reading $-\overset{|}{C})_n O = \overset{|}{C}-$    should read    $-\overset{|}{C})_n = \overset{|}{C}-$ .

Claim 4, line 2, that portion of the sentence reading "-N,N-" should read -- -(N,N- --.

SIGNED AND
SEALED
MAR 10 1970

(SEAL)
Attest:

Edward M. Fletcher, Jr.
Attesting Officer

WILLIAM E. SCHUYLER, JR.
Commissioner of Patents